July 28, 1931.   I. Q. GURNEE   1,816,011
MOLD
Filed Sept. 28, 1929
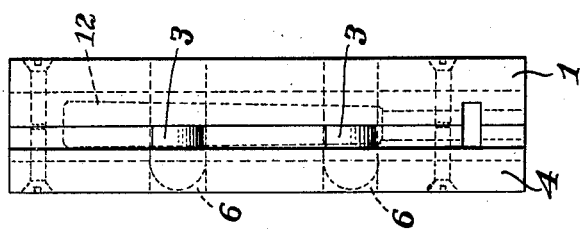
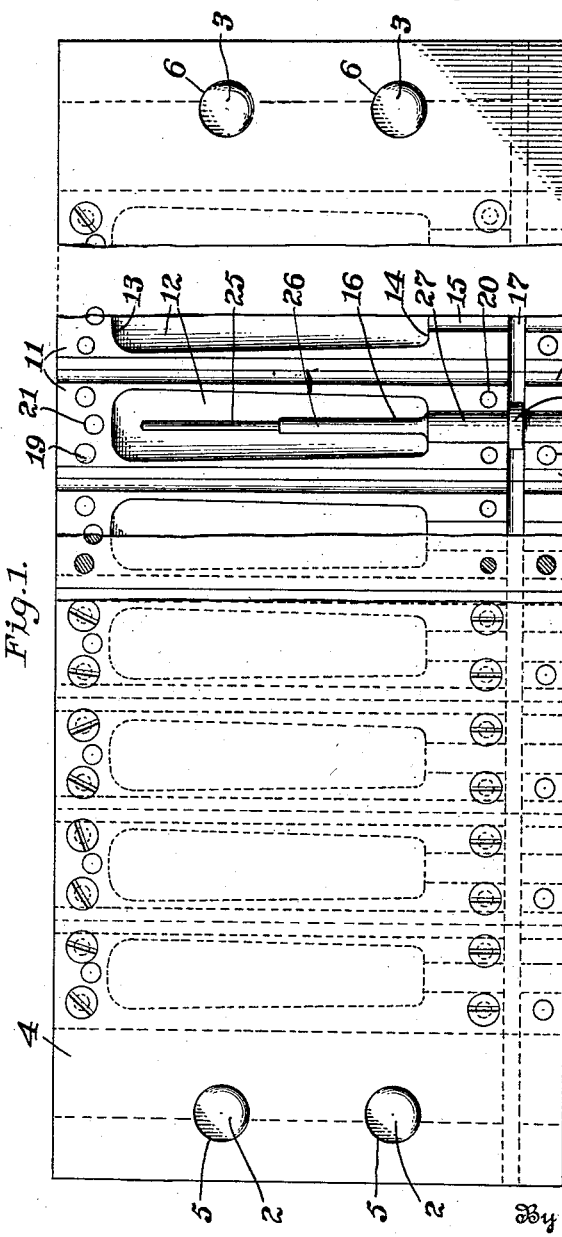
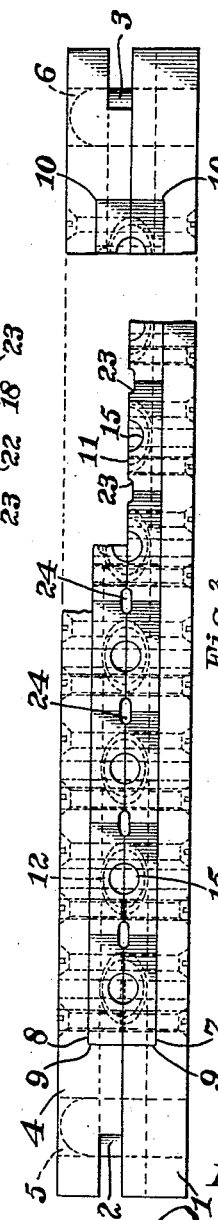
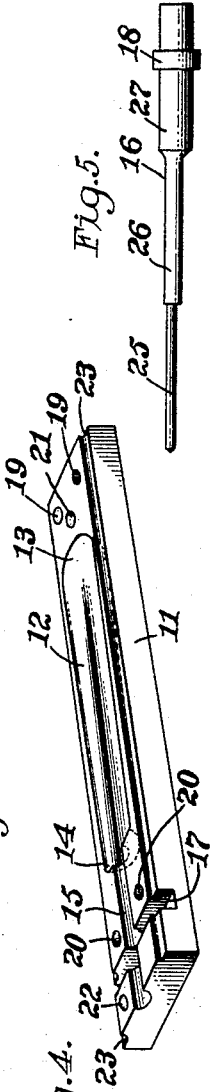
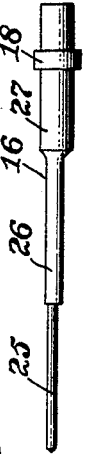
Inventor:
Isaac Q. Gurnee,
By Parker Cook
Attorney.

Patented July 28, 1931

1,816,011

UNITED STATES PATENT OFFICE

ISAAC Q. GURNEE, OF BUTLER, NEW JERSEY

MOLD

Application filed September 28, 1929. Serial No. 395,841.

My invention relates to new and useful improvements in molds, and more particularly to a mold for forming hard rubber goods, such as handles for knives and forks, and other small hard rubber articles.

Generally, molds that are used for forming hard rubber goods are made of tin or other soft metal alloy, as the sulphur in the rubber composition would affect an ordinary mold formed of steel or other hard metal.

A great disadvantage, however, in using a mold formed of relatively soft metal is that after the mold has been used for one or two days, the soft metal loses its shape, due to the heat and pressure incident to the use of the mold, and the mold has to be melted and recast.

One of the objects, therefore, of the present invention is to use a hard metal mold, which is plated with chromium, so that the vulcanizing process will not in any way affect the same, while a still further object of the invention is to provide a metal mold, which consists of two relatively large plates, to each of which is secured, in turn, a plurality of separate or distinct dies or cavities, so that when the two large plates are placed in position, these respective two halves will all be in perfect alignment to thereby prevent any overshot joint when they are in their molding position.

Still another object of the invention is to provide a mold in which there is to be secured a plurality of dies or cavities, which are to be screwed and dowel-pinned to a plate and, in a like manner, the remaining halves of the same are to be screwed and dowel-pinned to another plate, so that when the two plates or halves of the mold are fitted together, a multiplicity of the articles can be molded at the same time.

Still another object of the invention is to provide a mold having a multiplicity of dies or cavities which are removable in the event that a cavity is destroyed or damaged by any insert that might be used in molding cores in the same.

Still another object of the invention is to provide a multiplicity of dies in the form of small plates that are all of similar size and shape, which may be fastened in place by screws and dowel pins and all of which will be in perfect alignment and have channels that register with each other, so that after the article is molded and it is desired to remove the cores and molded articles, a tool may be placed in the channels and moved right along the same to thus carefully and progressively remove the cores and the molded articles.

Still another object of the invention is to provide a mold wherein these plurality of blocks with the cavities therein are made by placing the same over a correct sized hob which will even the two halves and while in position, they may be fastened with screws and dowel pins, so that each half, after once being placed in position, will always remain in its true relation when secured to its plate.

Still another object of the invention is to provide a mold wherein a plurality of metal inserts or dies, each of which has the desired shaped cavity therein, are to be perfectly aligned and will remain in true alignment throughout their life but, on the other hand, any one of these small plates or members may be quickly removed if the same becomes damaged in any way.

Still another object of the invention is to produce a mold that is especially designed for forming hard rubber handles for tangs, which mold may be used indefinitely rather than for but a few days, as is the common practice in molds of this kind.

With these and other objects in view, the invention consists in certain new and novel arrangements and combination of parts, as will be hereinafter more fully described and pointed out in the claims.

Referring now to the drawings showing a preferred embodiment,

Fig. 1 is a top plan view of the mold, a part of the upper portion being broken away to show the manner in which the insert is used for molding the core;

Fig. 2 is an end view of the same;

Fig. 3 is an edge view, parts being broken away to more clearly illustrate the invention;

Fig. 4 is a detail view of one of the halves or dies, a plurality of which make up the entire mold;

Fig. 5 is a detail view of the insert for forming the core of the handle.

Referring now more specifically to the several views, there is shown a bottom plate 1, which might be likened to the "drag" of a mold, which may be rectangular in form and of the desired thickness. It will be noticed that at its ends there are the respective sets of aligning pins 2 and 3, which will fit into like holes formed in an upper plate 4, which is provided with the holes or openings 5 and 6. This plate, of course, might be likened to the cope of an ordinary mold. These two metal plates may be made of iron or steel or from any other desirable metal that will provide the sufficient strength so that they will not in any way warp or bend from the heat to which they are to be subjected. As may be seen in Fig. 3, each of the plates has a large cut-out portion 7 and 8, which extends nearly the entire length of the plate to thus form the respective shoulders 9 near the one end and the respective shoulders 10 near the other end of the mold.

Taking up the gist of the invention, there is placed in each plate a plurality of separate dies or halves, and a description of one will be a description of all.

Referring for the moment to Fig. 4, there may be seen one of these dies or halves, which consists of a rectangular metal plate 11, which plate is to be made preferably of steel, and when used for making handles for knives, forks and like articles, it will have formed therein the depression or cavity 12 to shape the article to be molded. In the present instance, the depression is in the shape of a handle, the depression being slighty wider at its one end 13 than at its inner end 14, while registering with this depression 12 is a small channel 15, which extends out to the end of the plate, in which channel will rest the insert 16, as will be shortly described.

Also extending transversely of the plate or die 11, at its inner end, is the further channel or passageway 17, into which will fit the ring portion 18 formed on the insert 16. This channel 17 allows an operator to place a small tool or pick down in the channel and raise the insert to thus lift out the insert and the molded rubber article.

At the one end of this plate or die 11, there may be seen the two screw holes 19, while at the other end there may be seen the two similar holes 20. Two further holes 21 and 22 are likewise provided which receive dowel pins. As also may be seen on this die 11 at its opposite upper edges, there are small grooves 23, so that when a plurality of these are placed together, they form the little passageways 24 to receive the molded excess rubber when being compressed.

Having described the structural characteristics of these die plates, it might be mentioned that in making them up, they are first pressed, when soft, to the desired depth by a hardened hob (not shown) and then are worked to the desired size to be placed in position and secured to their plates which, of course, are made of suitable thickness. Each mold is placed over an absolutely correct sized hob, which evens the two halves and which keeps them in perfect alignment so as to prevent any overshot joint when they come together in actual use. These separate molds or cavities are then secured with the aforementioned screws and dowel pins, which hold the halves in true relation to each other when secured to the plate. This is then repeated with each and every die.

In other words, one of these dies 11 is placed up against an upper shoulder 9 and one against the lower shoulder in the two separate plates 1 and 4, and the two halves are then screwed and dowel-pinned to their respective plates, so that when the two halves of the mold are placed together, these plurality of small dies or cavities will be in perfect alignment. After the first one is thus positioned, the remaining ones are properly aligned and pinned, each one tightly abutting the adjacent one, so that in use, the knife handles will be smooth at their joints rather than being overshot and provided with fins or burrs which, of course, have to be removed. The shoulders on the plates act as a reinforcement and the eight small dies just fit snugly between them.

Referring for the moment to Fig. 5, one of the inserts 16 may be seen, it being provided with the aforementioned ring 18, while the other end portion 25 is reduced in diameter over the body portion 26 or 27.

Thus, the core or hole in the knife handle will have different diameters throughout its length to conform with the different thicknesses of the handle of the tang, which latter is to be inserted in this hard rubber handle.

In Fig. 1 of the drawings, I have shown an insert in place and it will be noticed that the channels 17 in each of the plates will register to form one straight channel extending nearly throughout the length of the mold, so that after the handles have been molded, the workman can lift the upper plate 4 from the plate 1 and with a small pick run it down the now long channel 17 and lift up the inserts and cores to thus quickly remove the same. The insert 16 also is held in its proper position by the provision of the passageway 15, while the ring 18 prevents the insert from moving forwardly or rearwardly of the mold, so that there is no chance for the insert to get out of alignment or position. It will be understood that the upper and lower halves of the mold are identical, with the exception of the aligning pins, and although I have only described in detail one of the halves of the die 11, the other half is identical in construction.

Should the metal insert damage its respective die or cavity, it is but a simple matter to remove the particular respective screws and drive out the dowel pins and align a new set of dies 11 in their respective positions.

The advantages of this will be readily seen, as in the ordinary molds made out of tin or soft metal, as soon as one of the cavities or compartments becomes damaged, it is necessary to melt up the metal and re-cast the entire mold. Furthermore, it is necessary to do this every two or three days, whereas the metal mold I have just outlined is capable of many years of use.

After all the small dies or members are placed in position or even before this is done, they are given a coating of chromium, so that the sulphur in the rubber contents will not affect the metal mold during the vulcanizing of the articles. By using chromium, therefore, it makes it possible to use a hard metal mold in this art of hard rubber manufacture.

It will also be understood that although the mold is especially designed for the making of hard rubber handles, other shaped depressions might be formed in these dies or members 11, so that other shaped hard rubber articles might as easily as well be molded, and I do not wish to be in any way limited to the particular shaped handle shown.

Of course, the cut-out portions in the two plates 1 and 4 must be exactly the right depth so that when the two halves of the small dies come together, there will be a tight fit. On the other hand, the aforementioned grooves will allow for the escape of the small portion of exuded rubber.

From the foregoing, it will be seen that I have designed a mold for use in the hard rubber industry, the life of which is unlimited, and wherein separate halves or dies may be readily and quickly inserted in case any one becomes damaged, so that it is not necessary in case of damage to one particular die or half to discard or remelt the entire mold. Furthermore, the life of the mold is of great length rather than of one or two days duration.

By providing the little channel 17 in each of the dies, the inserts will be properly held in position, and furthermore the workman may run a pick or sharp instrument right through the registering channels and quickly lift all of the molded articles from their respective cavities, so that the molded articles may be quickly removed.

Having thus described my invention, what I claim as new and desire to secure by Letters Patent is:

1. A mold comprising a lower plate, a plurality of dies fastened snugly within said plate, each of said dies provided with a transverse passageway to form a continuous passageway for supporting aligned cores within the die, each die also having a registering channel and cavity adapted to receive a core, each of said dies being held in aligned position by screws and dowel pins, the said dies being chromium coated, an upper plate also provided with like dies on its under surface and said dies being also doweled and screwed in position and said dies being chromium coated, means for holding the plates in aligned position and all of said dies being removable from said plates whereby new ones may be inserted, when necessary.

2. A mold comprising a lower plate having shoulders near its opposite end and a plurality of dies fitting between said shoulders, each of said dies being provided with a recess having a channel connected therewith and a transverse passageway near the end of said die whereby all of said transverse passageways form a continuous passageway adapted to hold cores in the respective recesses when all the dies are secured in said plate, a similarly arranged upper plate provided with like dies, and means for holding the two aligned plates in position.

3. A mold comprising an upper and lower plate and a plurality of like dies with each plate, means for aligning the plates, each of said dies comprising a relatively hard flat metal member having a recess therein and a channel registering with said recess to support a core, a transverse passageway crossing said channel, all of said passageways forming one continuous passageway when said dies are in position and said dies being coated with chromium.

4. A mold comprising in part a plurality of hard metal dies, each of said dies being provided with screw holes near its opposite ends and dowel holes near its opposite ends, each of said dies being also provided with a cavity and a channel registering therewith, a transverse passageway for holding aligned cores, and grooves formed near the upper opposite edges of said die to receive the excess composition when the mold is in use.

5. A mold comprising in part a die formed of two like halves, each of said halves comprising a rectangular member having a depression and a channel registering with said depression for holding a core, the opposite ends of the die being provided with screw holes and dowel holes, a passageway formed near one end of the die and crossing said channel and the opposite upper edges of the dies being grooved to receive the excess molded composition.

6. A mold comprising two plates, each of said plates having a plurality of dies removably secured therein, said dies accurately registering when the said plates are in position, means for holding the two plates in aligned position, a continuous passageway formed in said dies for holding the separate cores and providing means to receive an instrument to remove the cores, each of said dies provided with grooves to form passageways between the dies for receiving the excess of the molded composition and all of said dies being coated with chromium.

7. A mold for forming solid rubber handles, said mold comprising a plurality of adjacently located dies, said dies being securely fastened in position but removable in case of accident, each of said dies provided with a channel and cavity to receive a core, each of said dies also provided with a transverse passageway to form one continuous passageway for holding cores within the dies when the dies are assembled, and each of said dies further provided with longitudinally extending grooves to form channels to receive any excess of the molded composition.

8. A mold comprising an upper and lower half and each of said halves provided with dies adapted to accurately register when the mold is closed, each of said dies provided with a registering channel and cavity for the reception of a core, each of said dies provided with a transverse passageway to form one continuous passageway for the reception of cores when the mold is completed, each of said dies provided with longitudinal grooves to register with the like grooves of the adjacent die to form passageways to receive the excess composition when the handles are molded.

9. A mold comprising two plates and a die formed of two halves, each of said halves being similar, one of said halves being secured to the upper surface of one plate and the other of the halves being secured to the upper surface of the second plate, each of said halves being provided with a cavity, a channel and a transverse passageway, cores supported within said passageway, and each of said halves also provided with grooves along their upper edges and each of said dies being provided with dowel holes and screw holes, so that the dies may be securely held to the respective plates.

10. A mold for forming hard rubber articles comprising an upper and lower metal plate, said plates each being provided with a cut-away portion and a plurality of hard metal dies fitting within the cut-away portion, all of said dies being screwed and doweled to their respective plates, means for aligning the two plates, transverse passageways formed near the end of each die to form a continuous passageway, channels formed in each die for holding an insert to form the core of the handle, all of said dies being chromium plated, said dies being accurately aligned to provide against an overshot and each of said dies being provided with a groove along its upper edge whereby adjacent grooves form a passageway for the reception of any excess composition and all of said dies being removable from said plate in case of damage.

In testimony whereof I affix my signature.

ISAAC Q. GURNEE.